United States Patent
Hofmaier et al.

(10) Patent No.: US 11,912,130 B2
(45) Date of Patent: Feb. 27, 2024

(54) HYBRID DUAL CLUTCH TRANSMISSION (71) Applicant: DAIMLER AG, Stuttgart (DE)

(72) Inventors: Claus Hofmaier, Stuttgart (DE); Matthias Maisch, Sindelfingen (DE); Daniel Doll, Stuttgart (DE); Thomas Mattes, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 386 days.

(21) Appl. No.: 17/292,769

(22) PCT Filed: Oct. 31, 2019

(86) PCT No.: PCT/EP2019/079831
§ 371 (c)(1),
(2) Date: May 11, 2021

(87) PCT Pub. No.: WO2020/099136
PCT Pub. Date: May 22, 2020

(65) Prior Publication Data
US 2021/0394608 A1    Dec. 23, 2021

(30) Foreign Application Priority Data
Nov. 12, 2018 (DE) ...................... 10 2018 008 932.1

(51) Int. Cl.
B60K 6/48        (2007.10)
F16D 25/0638     (2006.01)
(Continued)

(52) U.S. Cl.
CPC ............... B60K 6/387 (2013.01); B60K 6/26 (2013.01); F16D 25/0638 (2013.01);
(Continued)

(58) Field of Classification Search
CPC . B60K 6/387; B60K 6/26; B60K 6/48; B60K 6/547; F16D 25/0638; F16D 25/10
(Continued)

(56) References Cited

U.S. PATENT DOCUMENTS 3,314,307 A * 4/1967 Egbert .................. F16H 47/085
                                              475/338
3,584,520 A * 6/1971 Borman .................. F16H 47/08
                                              475/285
(Continued)

FOREIGN PATENT DOCUMENTS

DE    102011117781 A1    5/2013
DE    102016219693 A1    4/2018
(Continued)

OTHER PUBLICATIONS

International Search Report dated Jan. 31, 2020 in related/corresponding International Application No. PCT/EP2019/079831.
(Continued)

Primary Examiner — Ha Dinh Ho
(74) Attorney, Agent, or Firm — PATENT PORTFOLIO BUILDERS PLLC (57) ABSTRACT A hybrid dual clutch transmission includes a first sub-transmission and a first clutch allocated to the first sub-transmission, a second sub-transmission and a second clutch allocated to the second sub-transmission, a separating clutch provided to decouple the hybrid dual clutch transmission from an internal combustion engine. The first clutch has a first outer disc carrier, the second clutch has a second outer disc carrier, and the separating clutch has a further outer disc carrier. The first clutch, the second clutch, and the separating clutch are stacked radially one above the other and are arranged at least substantially axially overlapping. The transmission also includes an electric motor having a rotor, a stator, and a housing. The transmission further includes a (Continued)

drive element permanently non-rotationally connected to the first outer disc carrier of the first clutch to link the electric motor.

7 Claims, 3 Drawing Sheets

(51) Int. Cl.
*F16D 25/10* (2006.01)
*B60K 6/387* (2007.10)
*B60K 6/26* (2007.10)
*B60K 6/547* (2007.10)

(52) U.S. Cl.
CPC ............... *F16D 25/10* (2013.01); *B60K 6/48* (2013.01); *B60K 6/547* (2013.01); *B60K 2006/4825* (2013.01); *B60Y 2200/92* (2013.01); *B60Y 2400/428* (2013.01)

(58) Field of Classification Search
USPC ........................................................ 74/665 L
See application file for complete search history.

(56) References Cited

U.S. PATENT DOCUMENTS

| | | | | |
|---|---|---|---|---|
| 3,977,272 A | * | 8/1976 | Neumann | F16H 3/66 |
| | | | | 475/205 |
| 4,400,998 A | * | 8/1983 | Bookout | F16H 3/663 |
| | | | | 475/71 |
| 4,602,522 A | * | 7/1986 | Dorpmund | F16H 47/085 |
| | | | | 475/56 |
| 10,406,908 B2 | * | 9/2019 | Brehmer | F16H 3/724 |

FOREIGN PATENT DOCUMENTS

| | | |
|---|---|---|
| DE | 102017104446 A1 | 9/2018 |
| WO | 2018054413 A1 | 3/2018 |
| WO | 2018054414 A1 | 3/2018 |

OTHER PUBLICATIONS

Office Action dated Sep. 19, 2019 in related/corresponding DE Application No. 10 2018 008 932.1.
Written Opinion dated Jan. 31, 2020 in related/corresponding International Application No. PCT/EP2019/079831.

* cited by examiner

HYBRID DUAL CLUTCH TRANSMISSION

BACKGROUND AND SUMMARY OF THE INVENTION

Exemplary embodiments of the invention relate to a hybrid dual clutch transmission.

A hybrid dual clutch transmission is already known from WO 2018/054414 A1.

Hybrid dual clutch transmissions having a first sub-transmission, having a second sub-transmission, having a first clutch, which is allocated to the first sub-transmission, having a second clutch, which is allocated to the second sub-transmission, having a separating clutch, which is provided to decouple the hybrid dual clutch transmission from an internal combustion engine, are already known from WO 2018/054413 A1, DE 10 2011 117 781 A1 and generic DE 10 2017 104 446 A1, wherein the first clutch has a first outer disc carrier, the second clutch has a second outer disc carrier and the separating clutch a further outer disc carrier, wherein the first clutch, the second clutch and the separating clutch are radially stacked one above the other and are arranged at least substantially in an axial region, having an electric motor, which has a rotor, a stator and a housing, and having a drive element, in particular a drive gearwheel, which is permanently non-rotationally connected to the outer disc carrier of the first clutch for linking the electric motor.

Exemplary embodiments of the invention are directed, in particular, to provide a generic device having improved properties in relation to a construction space and an advantageous integration of an electric motor.

The invention emerges from a hybrid dual clutch transmission having a first sub-transmission, having a second sub-transmission, having a first clutch, which is allocated to the first sub-transmission, having a second clutch, which is allocated to the second sub-transmission, having a separating clutch, which is provided to decouple the hybrid dual clutch transmission from an internal combustion engine or to couple it with the internal combustion engine, wherein the first clutch has a first force transmission region and a first outer disc carrier, the second clutch a second force transmission region and a second outer disc carrier and the separating clutch a further force transmission region and a further outer disc carrier, wherein the first force transmission region, the second force transmission region and the further force transmission region are stacked radially one above the other and are arranged at least substantially axially overlapping, having an electric motor, which has a rotor, a stator and a housing, and having a drive element, in particular a drive gearwheel, which is permanently non-rotationally connected to the first outer disc carrier of the first clutch for linking the electric motor.

The term axial overlapping in relation to, for example, two elements, means that two elements are arranged at least partially in the same axial region in relation to a common axis, in particular a main rotation axis. The two elements can here have radially different distances apart from the main rotation axis.

The term radially stacking elements one above the other means that the elements have different radial distances apart from a common axis, in particular from the main rotation axis.

The main rotation axis of the hybrid dual clutch transmission advantageously means a common rotation axis of the first clutch, the second clutch and the separating clutch.

It is further assumed that the first outer disc carrier of the first clutch, the second outer disc carrier of the second clutch and the further outer disc carrier of the separating clutch are permanently non-rotationally connected to one another.

The first clutch is formed, in particular, as a first disc clutch. Preferably, the first clutch comprises a first inner disc carrier and the first outer disc carrier. Particularly preferably, the first inner disc carrier bears at least one first inner disc, preferably a plurality of first inner discs. Furthermore, the first outer disc carrier particularly preferably bears at least one first outer disc, preferably a plurality of first outer discs. Preferably, the at least one first inner disc and the at least one first outer disc, particularly preferably in an alternating arrangement, form a first clutch pack. Furthermore, the second clutch, in particular, is formed as a second disc clutch. Preferably, the second clutch comprises the second inner disc carrier and the second outer disc carrier. Particularly preferably, the second inner disc carrier bears at least one second inner disc and preferably a plurality of second inner discs. Furthermore, the second outer disc carrier particularly preferably bears at least one second outer disc and preferably a plurality of second outer discs. Preferably, the at least one second inner disc and the at least one second outer disc, particularly preferably in an alternating arrangement, form a second clutch pack.

Preferably, the first outer disc carrier, the second outer disc carrier and the further outer disc carrier at least partially have the same axial extension region.

Thus, a low axial construction length of the hybrid dual clutch transmission, in particular the transmission head, can advantageously be achieved.

"At least substantially" is to be understood, in particular, to mean that that a deviation from a predetermined value is, in particular, less than 25%, preferably less than 10% and particularly preferably less than 5% of the predetermined value. In particular, the first clutch, the second clutch, the separating clutch and the drive element form a transmission head of the hybrid dual clutch transmission. The transmission head can be formed modularly, which enables an advantageously simple development and/or variation of individual components of the hybrid dual clutch transmission. The transmission head has a housing, which is formed, in particular, as a part of a transmission housing. Advantageously, the transmission head can be mounted independently of the sub-transmissions.

A "separating clutch" is to be understood, in particular, as a clutch that is provided to decouple the internal combustion engine from all sub-transmissions. "Provided" is to be understood, in particular, as specially designed and/or specially equipped. An object being provided for a certain function is to be understood, in particular, in that the object fulfils and/or carries out this particular function in at least one application and/or operation state. Preferably, the separation coupling is formed optimally in terms of drag torque. Particularly advantageously, the internal combustion engine can be coupled out of the hybrid dual clutch transmission by the separating clutch in an electric driving operation state.

The separating clutch is formed, in particular, as a further disc clutch. Preferably, the separating clutch comprises a further inner disc carrier and the further outer disc carrier. Particularly preferably, the further inner disc carrier bears at least one further inner disc and preferably a plurality of further inner discs. Furthermore, the further outer disc carrier particularly preferably bears at least one further outer disc and preferably a plurality of further outer discs. Preferably, at least one further inner disc and the at least one further outer disc, particularly preferably in an alternating arrangement, form a further clutch pack.

A "non-rotational connection" of two rotatably mounted components means that the two components are arranged coaxially and are connected to each other in such a way that they rotate with the same angular speed.

A "non-rotational connection" of a rotatably mounted component with a housing means that the component is connected to the housing in such a way that it cannot be rotated in relation to the housing.

Two non-rotationally connected components can be moved axially in opposition to each other.

Advantageously, the first sub-transmission and the second sub-transmission each comprise at least one switching unit, particularly preferably a plurality of switching units, at least one fixed gear, advantageously a plurality of fixed gears, of which preferably one fixed gear is formed as an output gear, and at least one idler, advantageously a plurality of idlers.

The hybrid dual clutch transmission comprises the main rotation axis and, for example, two ancillary rotation axes, yet at least one ancillary rotation axis. The "ancillary rotation axis" is to be understood, in particular, as a rotation axis arranged offset in parallel to the main rotation axis. A first ancillary rotation axis is allocated to the first sub-transmission and a second ancillary rotation axis is allocated to the second sub-transmission, for example. In particular, a dual clutch of the hybrid dual clutch transmission is formed by the first clutch and the second clutch. Advantageously, the dual clutch is formed to be power-shifted. The terms "axial" and "radial" relate to the main rotation axis.

A "drive element" is to be understood, in particular, as a gearwheel, a chainwheel, a belt pulley or similar. The drive element is provided, in particular, to form a link of an electric motor to the dual clutch transmission, in particular so as to transfer rotational torque.

Preferably, a rotor axis of the electric motor is arranged in parallel to the main rotation axis, whereby an axially shortly constructing hybrid dual clutch transmission can be depicted in comparison to a coaxial arrangement of the electric motor in relation to the dual clutch. The rotor axis is arranged in parallel to and spaced apart from the main rotation axis.

Preferably, the electric motor has an output element, in particular a pinion. The "output element" is to be understood, in particular, as a gearwheel, a chainwheel, a pulley or similar, which is provided to transfer a rotational torque, a rotational direction and/or a rotational speed of the electric motor. The drive element and the output element are coupled to each other. The drive element and the output element are substantially arranged in the same axial region in relation to the main rotation axis.

The electric motor can be formed, in particular, with high voltage technology or low voltage technology. An electric motor with low voltage technology has a voltage of 48V, in particular. The rotation axis of the electric motor is aligned axially in parallel to the main rotation axis of the hybrid dual clutch transmission. The electric motor is, in particular, side-by-side with the dual clutch. Particularly preferably, the rotor is arranged radially inside the stator.

In particular, the stator has a plurality of coils, which are provided for generating a magnetic field. Furthermore, the rotor has, in particular, a plurality of magnets, in particular permanent magnets, which are provided to interact with the magnetic field of the stator and to move the rotor in relation to the stator. Preferably, the electric motor has a radial clearance, which is provided, in particular, for cooling the electric motor. The clearance is formed, in particular, between the housing of the electric motor and the stator. The clearance has a radial spacing between the housing of the electric motor and the stator of preferably at least 1 mm, preferably at least 5 mm and particularly preferably exactly 10 mm. Preferably, an axial extension of the electric motor is arranged within an axial extension of the hybrid dual clutch transmission.

As a result of the design of the hybrid dual clutch transmission, a high degree of efficiency, in particular construction space efficiency and/or component efficiency, can be achieved. In particular, a compact construction with an advantageously small axial construction length can be made possible. Advantageously, an electrical driving operation state and/or sailing driving operation state can be provided. As a result of the modular construction of the hybrid dual clutch transmission, it can be achieved, in particular, to simply exchange components of the hybrid dual clutch transmission. In a development of a hybrid dual clutch transmission, an exchange of modules can advantageously be carried out and a new development of the hybrid dual clutch transmission is not necessary. This advantageously means reduced development and production costs. Furthermore, a separate checking of the transmission head and/or further modular components of the hybrid dual clutch transmission can advantageously be made possible.

Furthermore, it is assumed that the hybrid dual clutch transmission has at least one connection unit, which comprises at least the first outer disc carrier of the first clutch, the second outer disc carrier of the second clutch and the further outer disc carrier of the separating clutch. The connection unit preferably comprises at least one barrel housing. The connection unit comprises, in particular, at least one cover housing. Preferably, the cover housing seals the barrel housing. The connection unit preferably comprises at least one inner housing. The connection unit preferably comprises at least one connection shaft, which is formed, particularly preferably, as a hollow shaft.

The connection unit preferably forms at least the outer disc carrier. In particular, the connection unit forms the first outer disc carrier of the first clutch, the second outer disc carrier of the second clutch and the further outer disc carrier of the separating clutch. The "connection unit" is to be understood, in particular, as a component and/or an assembly group, which permanently non-rotationally connects at least two components of the transmission to each other.

Preferably, the non-rotationally connected components of the connection unit are connected to one another in a firmly bonded, positive locking and/or frictional manner. The connection unit can be formed in several parts, wherein, in particular, all parts of the connection unit are permanently non-rotationally connected to one another. Particularly preferably, the connection unit is formed integrally with at least one outer disc carrier. "Integrally" is to be understood, in particular, as at least connected in a firmly bonded manner, for example by means of a welding process, an adhesion process, a molding process and/or a different process that seems sensible to the person skilled in the art, and/or advantageously understood as formed in one piece, such as by means of a production from a cast, for example, and/or by means of a production in a single or multiple component injection molding method and/or advantageously in a deformation method from a single blank. Thus, an advantageously reduced number of components rotating in relation to one another can be achieved in particular.

According to the invention, the hybrid dual clutch transmission has a first bearing point for supporting the at least one connection unit, which is arranged axially between the separating clutch and the internal combustion engine, and a second bearing point for supporting the at least one connection unit, which is arranged axially between the clutches and the sub-transmissions. A "bearing point" is to be understood, in particular, as a region of a component which is provided to receive a bearing. The first bearing point is provided, in particular, for receiving a first bearing that supports the connection unit against a housing, advantageously against a housing of the transmission head. Preferably, the first bearing is formed as a radial bearing, in particular as a ball bearing. The second bearing point is provided, in particular, for receiving a second bearing that supports the connection unit against a housing, advantageously against the housing of the electric motor.

Advantageously, the first bearing point and the second bearing point are arranged radially inside all three force transmission regions in relation to the main rotation axis.

Advantageously, the drive element is arranged axially between each of the three force transmission regions and each of the two sub-transmissions.

Advantageously, the first bearing point and the second bearing point are arranged axially on opposite sides of the three force transmission regions.

Preferably, the second bearing is formed as a radial bearing, in particular as a cylindrical roller bearing. By means of the arrangement of the first bearing point and the second bearing point, a high degree of construction space efficiency can advantageously be achieved. As a result of the first bearing point, an advantageously low-loss mounting, in particular, can be provided.

Preferably, the housing of the electric motor is connected, in particular frictionally, to the housing of the transmission head. The housing of the electric motor and housing of the transmission head can also be formed by a single integrated housing.

Furthermore, it is proposed that the hybrid dual clutch transmission has a third bearing point, which is provided to support the rotor of the electric motor, arranged axially in parallel to the dual clutch, against the housing of the electric motor, wherein the third bearing point and the second bearing point are arranged at least substantially in the same axial region in relation to the main rotation axis. The third bearing point and the second bearing point are arranged at least partially axially overlapping in relation to the main rotation axis.

The third bearing point is provided, in particular, for receiving a third bearing, which supports the rotor of the electric motor against the housing of the electric motor. Preferably, the third bearing is formed as a radial bearing, in particular as a ball bearing. An "axial region" is to be understood, in particular, as an extension region along the main rotation axis delimited by a first plane and by a second plane, wherein the first plane and the second plane are aligned perpendicularly to the main rotation axis. Preferably, the third bearing point is arranged radially outside the second bearing point. As a result of the third bearing point, an advantageous low-loss bearing, in particular, can be provided.

Furthermore, it is proposed that the housing of the electric motor has an at least substantially planar housing region, which is arranged at least substantially perpendicularly to the rotor axis of the electric motor and axially on a side of the electric motor facing towards the at least one connection unit, wherein the housing region has two at least substantially circular recesses, wherein a first recess is provided to receive the second bearing point and a second recess to receive the third bearing point. A "planar housing region" is to be understood, in particular, as a substantially planar region of the housing, wherein a largest side face of a cuboid, which still completely surrounds the planar housing region, is substantially larger, in particular at least 10 times, preferably 20 times and particularly preferably 30 times larger, than a side face of the cuboid extending perpendicularly to the largest side face. Preferably, this is to be understood, in particular, as a substantially planar wall of the housing. Preferably, this is to be understood, in particular, as a wall on an end face of a cylindrical housing, which is substantially planar, wherein the planar housing region on a plane of this wall can extend beyond the actual end face of the cylindrical housing, wherein the plane can be divided into several surfaces by at least one housing part. The electric motor can thus advantageously be integrated into the hybrid dual clutch transmission. The electric motor can thus be advantageously integrated into the hybrid dual clutch transmission. In particular, the electric motor can be advantageously integrated into the hybrid dual clutch transmission with minimal mounting effort.

In addition, it is proposed that the further force transmission region of the separating clutch is arranged outside the first force transmission region of the first clutch when viewed radially from the main rotation axis, and the first force transmission region of the first clutch is arranged outside the second force transmission region of the second clutch when viewed radially from the main rotation axis. Preferably, the second force transmission region is arranged radially inside the first force transmission region. Furthermore, the first force transmission region is preferably arranged radially inside the further force transmission region. By means of the arrangement, an advantageously high degree of construction space efficiency can be achieved, in particular.

Furthermore, the drive element is arranged at least substantially in a radial region of the first clutch, in particular in a radial region of the first force transmission region. Advantageously, the drive element is arranged at least partially radially overlapping with the first force transmission region.

The "radial region" is to be understood, in particular, as an extension region delimited by inner dimensions of a first radius and by outer dimensions of a second radius, wherein the radial region runs unlimited in the direction of the main rotation axis. As a result of the arrangement, an advantageously high degree of construction space efficiency can be achieved, in particular.

Furthermore, the electric motor has at least one supply port, which is arranged axially on a side of the electric motor facing away from the connection unit. A "supply port" is to be understood, in particular, as an interface on a housing of an electric motor, wherein the interface is provided, in particular, for attaching the electric motor to an energy source, a coolant circuit and/or a data source. By means of a supply port, a modular hybrid dual clutch transmission can advantageously be provided. In particular, the electric motor can advantageously be mounted and/or changed easily as a module. Particularly advantageously, an electric motor with high-voltage technology can be exchanged for an electric motor with low voltage technology or an electric motor with low voltage technology can be exchanged for an electric motor with high voltage technology. In addition, a supply port offers a simple attachment which acts advantageously on the mounting duration when expanding and/or installing the electric motor.

Further advantages emerge from the description of the figures below. In the figures, an exemplary embodiment of the invention is depicted. The figures, the description of the figures and the claims contain numerous features in combination. The person skilled in the art will expediently also consider the features individually and combine them to form sensible further combinations.

BRIEF DESCRIPTION OF THE DRAWING FIGURES

Here are shown.

DETAILED DESCRIPTION

Figure 1:
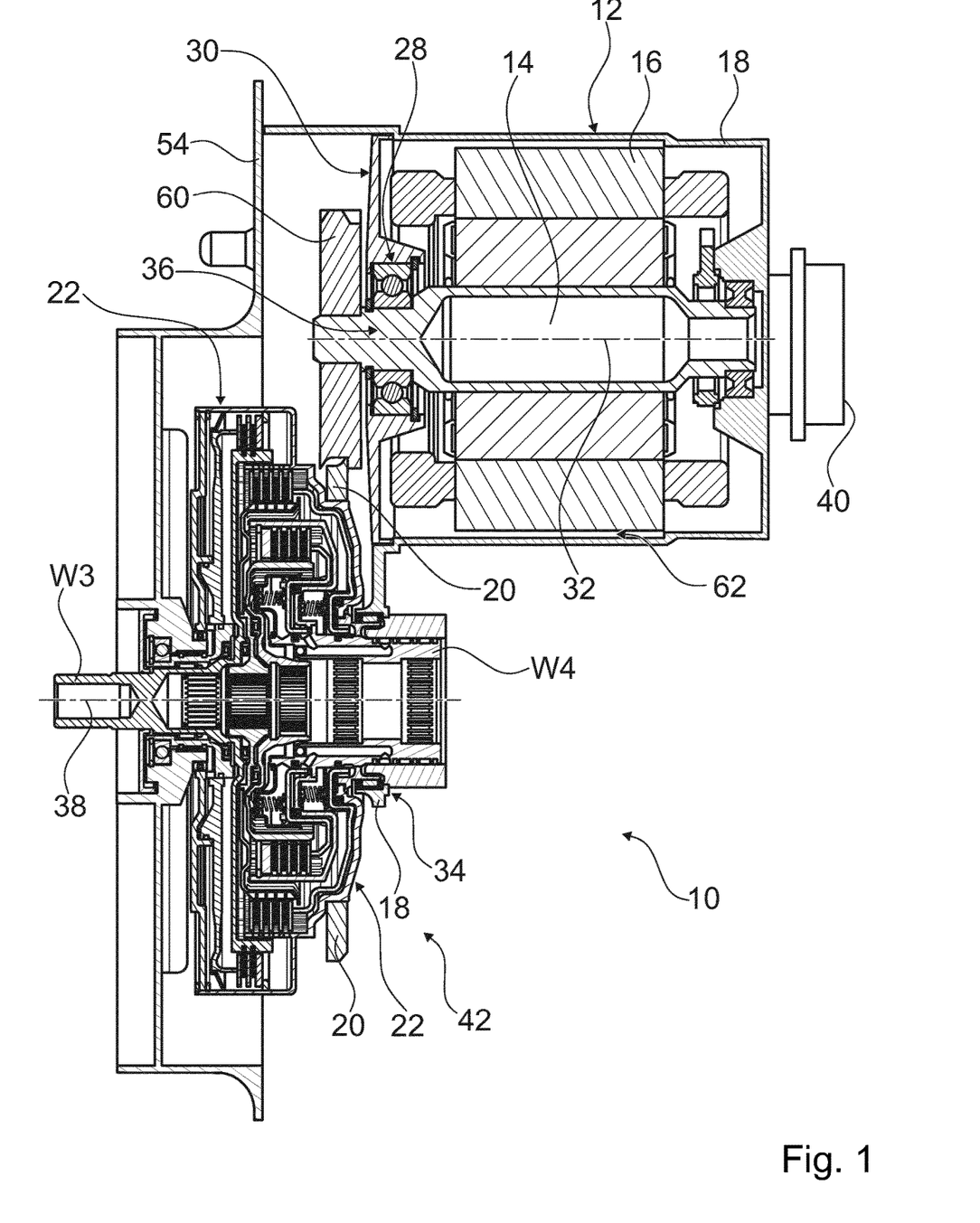
FIG. 1 a sectional depiction of the hybrid dual clutch transmission without the first and the second sub-transmission, FIG. 2 an enlarged cut-out of FIG. 1 and FIG. 3 a schematic depiction of the hybrid dual clutch transmission in connection with an internal combustion engine.
Figure 2:
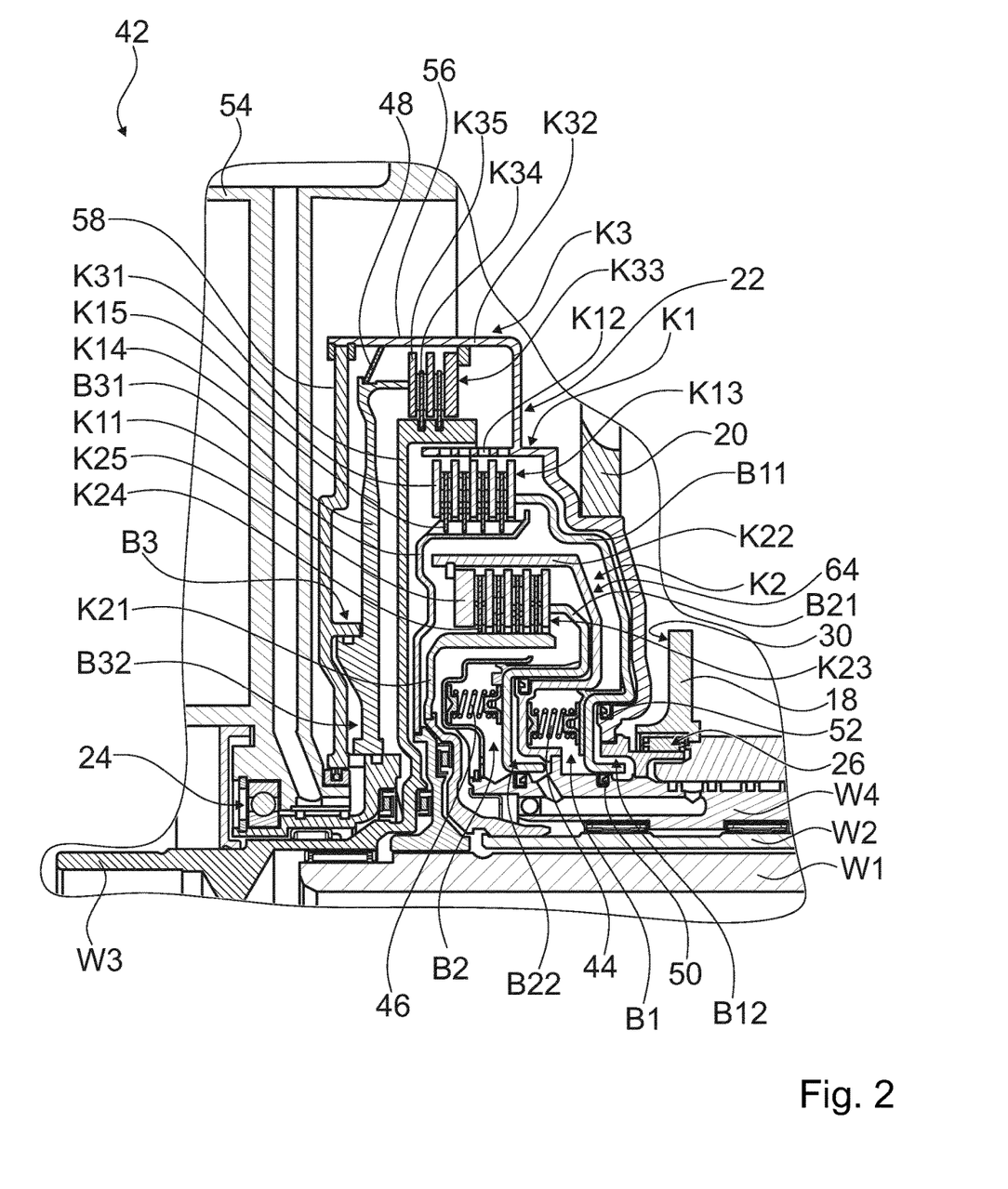
Figure 3:
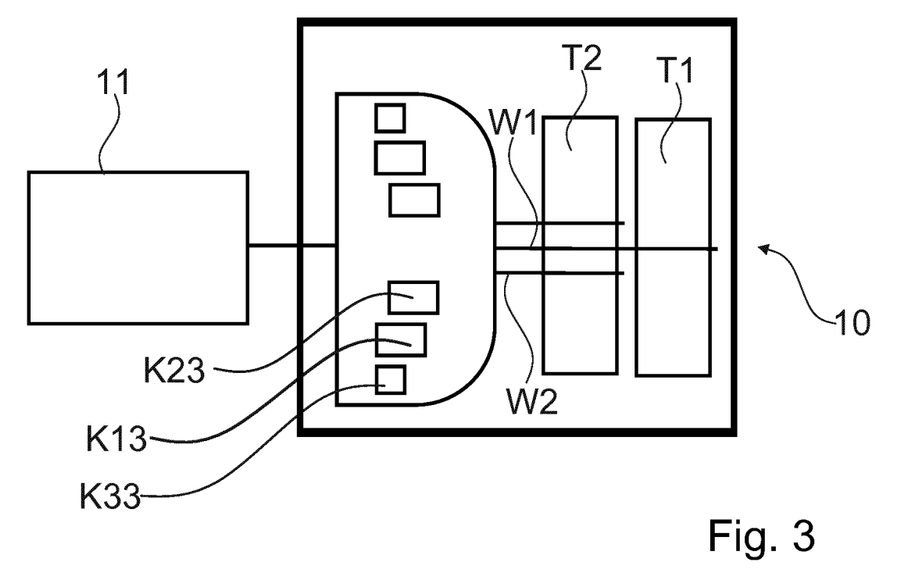

FIGS. 1 and 2 show a hybrid dual clutch transmission 10 according to the invention. FIG. 3 shows the hybrid dual clutch transmission 10 in connection with an internal combustion engine 11.

The hybrid dual clutch transmission 10 comprises a first sub-transmission T1 and a second sub-transmission T2. The first sub-transmission T1 is provided for switching odd gears. The first sub-transmission T1 has a first input shaft W1. The first input shaft W1 is formed as an inner input shaft. The first input shaft W1 is formed as a first hollow shaft. However, it is also conceivable to form a first transmission shaft W1 as a solid shaft. The second sub-transmission T2 is provided for switching even gears. The second sub-transmission T2 has a second input shaft W2. The second input shaft W2 is formed as a hollow shaft. The first sub-transmission T1 and the second sub-transmission T2 further have several switching units not depicted in more detail. The switching units are provided to produce switchable connections between transmission shafts, fixed gears and/or idlers of the sub-transmission T1, T2. However, it is also conceivable, in principle, that the first sub-transmission T1 is provided to switch even gears and the second sub-transmission T2 to switch odd gears. Advantageously, the second input shaft W2 is arranged radially outside the first input shaft W1 and/or the first input shaft W1 is formed as an inner input shaft and the second input shaft W2 as an outer input shaft. In doing so, a high degree of construction space efficiency can advantageously be achieved. Furthermore, an advantageous dual clutch construction can be made possible.

The hybrid dual clutch transmission 10 has a drive shaft W3. The driveshaft W3 is coupled to the internal combustion engine 11. The drive shaft W3 is provided to be driven by the internal combustion engine 11.

The hybrid dual clutch transmission 10 comprises an electric motor 12. The electric motor 12 has a rotor 14. The electric motor 12 has a stator 16. The electric motor 12 has a housing 18. The hybrid dual clutch transmission 10 has a drive element 20.

The hybrid dual clutch transmission 10 has a first clutch K1, which is allocated to the first sub-transmission T1 and is formed as a disc clutch. The first clutch K1 has a first inner disc carrier K11. The first inner disc carrier K11 is permanently non-rotationally connected to the first input shaft W1 of the first sub-transmission T1. The first inner disc carrier K11 bears a plurality of first inner discs K14, of which only one part is depicted in FIGS. 1 and 2. The first inner discs K14 are connected non-rotationally and axially shiftably to the first inner disc carrier K11. The first clutch K1 has a first outer disc carrier K12. The first outer disc carrier K12 bears a plurality of first outer discs K15, of which only one part is depicted in FIGS. 1 and 2. The first outer discs K15 are non-rotationally and axially shiftably connected to the first out a disc carrier K12. The first outer disc carrier K12 is permanently non-rotationally connected to a second outer disc carrier K22 and to a further outer disc carrier K32. The first clutch K1 has a first force transmission region K13 having a first clutch pack. The first inner discs K14 and the first outer discs K15 form the first clutch pack of the first force transmission region K13. The first inner discs K14 and the first outer discs K15 engage alternatingly in one another.

The hybrid dual clutch transmission 10 has a second clutch K2, which is allocated to the second sub-transmission T2 and is formed as a disc clutch. The second clutch K2 has a second inner disc carrier K21. The second inner disc carrier K21 is permanently non-rotationally connected to the second input shaft W2 of the second sub-transmission T2. The second inner disc carrier K21 bears a plurality of second inner discs K24, of which only one part is depicted in FIGS. 1 and 2. The second clutch K2 has the second outer disc carrier K22. The second outer disc carrier K22 bears a plurality of second outer discs K25, of which only one part is depicted in FIGS. 1 and 2. The second outer disc carrier K22 is permanently non-rotationally connected to the first outer disc carrier K12 and to the further outer disc carrier K32. The second clutch K2 has a second force transmission region K23 having a second clutch pack. The second inner discs K24 and the second outer discs K25 form the second clutch pack of the second force transmission region K23. The second inner discs K24 and the second outer discs K25 engage alternatingly in one another.

The hybrid dual clutch transmission 10 has a separating clutch K3, which is provided to decouple the hybrid dual clutch transmission 10 from the internal combustion engine 11. The separating clutch K3 is formed as a disc clutch. The separating clutch K3 has a further in a disc carrier K31. The further inner disc carrier K31 is permanently non-rotationally connected to the drive shaft W3. The further inner disc carrier K31 bears a plurality of first inner discs K34, of which only one part is depicted in FIGS. 1 and 2. The further inner discs K34 are non-rotationally and axially shiftably connected to the further inner disc carrier K31. The further inner disc carrier K31 and the drive shaft W3 are formed as a single component. The separating clutch K3 has the further outer disc carrier K32. The further outer disc carrier K32 is permanently non-rotationally connected to the first outer disc carrier K12 and to the second outer disc carrier K22. The further outer disc carrier K32 bears a plurality of further outer discs K35, of which only one part is depicted in FIGS. 1 and 2. The further outer discs K35 are non-rotationally and axially shiftably connected to the further outer disc carrier K32. The separating clutch K3 has a further force transmission region K33 having a further clutch pack K33. The further inner discs K34 and the further outer discs K35 form the further clutch pack of the further force transmission region K33. The further inner discs K34 and the further outer discs K35 engage alternatingly in one another.

The first outer disc carrier K12 of the first clutch K1, the second outer disc carrier K22 of the second clutch K2 and the further outer disc carrier K32 of the separation clutch K3 are permanently non-rotationally connected to one another. The first outer disc carrier K12 and the further outer carrier K32 are formed particularly preferably as a single component.

The hybrid dual clutch transmission 10 has a transmission head 42 (FIG. 2). The first clutch K1, the second clutch K2, the separating clutch K3, and the drive element 20 form the transmission head 42 of the hybrid dual clutch transmission 10. The transmission head 42 of the hybrid dual clutch transmission 10 has, for example, an axial length of 390 mm. Thus, a small axial construction length of the hybrid dual clutch transmission 10, in particular of the transmission head 42, can advantageously be achieved.

The force transmission regions K13, K23, K33 of the first clutch K1, the second clutch K2, and the separating clutch K3 are stacked radially one above the other and are arranged at least substantially in a same axial region. The dual clutch consists of the first clutch K1 and the second clutch K2. The first force transmission region K13 of the first clutch K1 surrounds the second force transmission region K23 of the second clutch K2. The first force transmission region K13 of the first clutch K1 is arranged radially outside the second force transition region K23 of the second clutch K2. The further force transmission region K33 of the separating clutch K3 is arranged radially outside the first force transmission region K13 of the first clutch K1. The force transmission regions K13, K23, K33 are arranged at least partially axially overlapping.

The hybrid dual clutch transmission 10 has at least one connection unit 22. The connection unit 22 comprises at least the first outer disc carrier K12 of the first clutch K1, the second outer disc carrier K22 of the second clutch K2 and the further outer disc carrier K32 of the separation clutch K3. The connection unit 22 comprises at least one barrel housing 56. The connection unit 22 comprises at least one cover housing 58. The cover housing 58 seals the barrel housing 56. The cover housing 58 is connected non-rotationally to the barrel housing 56. The barrel housing 56 forms at least the first outer disc carrier K12 of the first clutch K1 and the further outer disc carrier K32 of the separating clutch K3. The connection unit 22 comprises at least one inner housing 64. The inner housing 64 is connected non-rotationally to the cover housing 58 and the barrel housing 56. The inner housing 64 forms at least the second outer disc carrier K22 of the second clutch K2. The connection unit 22 comprises at least one connection shaft W4. The connection shaft W4 is formed as a hollow shaft. Preferably, the components of the connection unit 22 are connected to one another in a firmly bonded, positive locking and/or force-fitting manner.

The hybrid dual clutch transmission 10 comprises a first actuation unit B1. The first actuation unit B1 is arranged radially inside the force transmission region K23 of the second clutch K2. The first actuation unit B1 is arranged axially at least partially in the region of the first clutch K1. The first actuation unit B1 is provided for a hydraulic actuation of the first clutch K1. The first clutch K1 comprises a first actuation piston B11, which is arranged axially moveably. The first actuation unit B1 has a first actuation chamber B12. The first actuation chamber B12 is arranged radially inside the force transmission region K23 of the second clutch K2. The first actuation chamber B12 is arranged axially at least substantially outside the clutches K1, K2, K3. A first actuation oil pressure can be constructed in the first actuation chamber B12. With a high first actuation oil pressure in the first actuation chamber B12, the first actuation piston B11 is provided to close the first clutch K1. With a low first actuation oil pressure in the first actuation chamber B12, a first return spring 44 is provided to remove the first actuation piston B11 from the first clutch K1.

The hybrid dual clutch transmission 10 comprises a second actuation unit B2. The second actuation unit B2 is arranged radially inside the force transmission region K23 of the second clutch K2. The second actuation unit B2 is arranged axially at least substantially in the region of the second clutch K2. The second actuation unit B2 is provided for a hydraulic actuation of the second clutch K2. The second clutch K2 comprises a second actuation piston B21, which is arranged axially moveably. The second actuation unit B2 has a second actuation chamber B22. The second actuation chamber B22 is arranged radially inside the force transmission region K23 of the second clutch K2. The second actuation chamber B22 is arranged axially completely inside the force transmission region K23 of the second clutch K2. A second actuation oil pressure can be constructed in the second actuation chamber B22. With a high second actuation oil pressure in the second actuation chamber B22, the second actuation piston B21 is provided to close the second clutch K2. With a low second actuation oil pressure in the second actuation chamber B22, a second return spring 46 is provided to remove the second actuation piston B21 from the second clutch K2.

The hybrid dual clutch transmission 10 comprises a further actuation unit B3. The further actuation unit B3 is arranged radially at least substantially radially inside the force transmission region K23 of the second clutch K2. The further actuation unit B3 is arranged axially next to a side of the first clutch K1 facing towards the drive shaft W3. The further actuation unit B3 is provided for a hydraulic activation of the separating clutch K3. The separating clutch K3 comprises a further actuation piston B31, which is arranged axially moveably. The further actuation unit B3 has a further actuation chamber B32. The further actuation chamber B32 is arranged radially at least substantially inside the force transmission region K23 of the second clutch K2. The further actuation chamber B32 is arranged axially so as not to overlap with all three force transmission regions K13, K23, K33. In the further actuation chamber B32, a further actuation oil pressure can be constructed. With a high further actuation oil pressure in the further actuation chamber B32, the further actuation piston B31 is provided to close the separating clutch K3. With a low further actuation oil pressure in the further actuation chamber B32, a first return spring 48 is provided to remove the further actuation piston B31 from the separation clutch K3. The further actuation unit B3 has a further actuation oil, which can be radially supplied to the actuation chamber B32. Thus, an advantageous actuation oil distribution can be achieved.

Furthermore, the hybrid dual clutch transmission 10 comprises a plurality of sealing elements, of which, by way of example in FIG. 2, two sealing elements 50, 52 of the first actuation unit B1 are provided with a reference numeral. The sealing elements are provided to seal gaps between components of the actuation units B1, B2, B3 from actuation oil.

The hybrid dual clutch transmission 10 has a first bearing point 24 for supporting the at least one connection unit 22. The first bearing point 24 is provided for a direct or indirect support of the at least one connection unit 22. The barrel housing 56 is supported on the first bearing point 24 via the cover housing 58. The first bearing point 24 is arranged axially between the separation clutch K3 and the internal combustion engine 11. The first bearing point 24 is provided to receive a first bearing. The transmission head 42 has a housing 54. The housing 54 of the transmission head 42 is formed as a part of a housing of the hybrid dual clutch transmission 10 not depicted in more detail. The first bearing point 24 supports the at least one connection unit 22 against the housing 54 of the transmission head 42. The first bearing point 24 is formed as a radial bearing, in particular as a ball bearing. The first bearing point 24 supports the cover housing 58 of the connection unit 22.

The hybrid dual clutch transmission 10 has a second bearing point 26 for supporting the at least one connection unit 22. The second bearing point 26 is arranged axially between the clutches K1, K2, K3 and the sub-transmissions T1, T2. The second bearing point 26 is provided to receive the second bearing. The second bearing point 26 supports the connection unit 22 against the housing 18 of the electric motor 12. The second bearing supports that at least one connection unit 22 against the housing 18 of the electric motor 12. The second bearing is formed as a radial bearing, in particular as a cylinder roller bearing. The second bearing is coupled to at least one connection unit 22. The second bearing is coupled to the housing 18 of the electric motor 12.

The hybrid dual clutch transmission 10 has a third bearing point 28. The third bearing point 28 is provided to support the rotor 14 of the electric motor 12 against the housing 18 of the electric engine 12. The third bearing point 28 and the second bearing point 26 are arranged at least substantially in an axial region. The third bearing point 28 is provided to receive a third bearing. The third bearing 28 supports the rotor 14 of the electric motor 12 against the housing 18 of the electric motor 12. The third bearing is formed as a radial bearing, in particular as a ball bearing. The third bearing is coupled to the rotor 14 of the electric motor 12. The third bearing is coupled to the housing 18 of the electric motor 12.

The further inner disc carrier K31 is rotatably mounted in relation to the first input shaft W1. The connection shaft W4 is rotatably mounted in relation to the second input shaft W2. The further inner disc carrier K31 is rotatably mounted in relation to the cover housing 58. The first inner disc carrier K11 is rotatably mounted in relation to the further inner disc carrier K31. The second inner disc carrier K21 is rotatably mounted in relation to the first inner disc carrier K11.

The drive element 20 is permanently non-rotationally connected to the first outer disc carrier K12 of the first clutch K1. The drive element 20 is permanently non-rotationally connected to the first outer disc carrier K12 of the first clutch K1 to form a link of the electric motor 12. The drive element 20 is permanently non-rotationally connected to the further outer disc carrier K32 of the separating clutch K3. The drive element 20 is permanently non-rotationally connected to the further outer disc carrier K32 of the separating clutch K3 to form a link of the electric motor 12. The drive element 20 is formed as a drive gearwheel. The drive element 20 is arranged axially between the clutches K1, K2, K3 and the sub-transmissions T1, T2. The drive element 20 is arranged at a substantially in a radial region of the first clutch K1.

The electric motor 12 is arranged radially outside the transmission head 42. The electric motor 12 has an output element 60. The output element 60 is permanently non-rotationally connected to the rotor 14. The output element 60 is formed as a pinion. An axial extension of the electric motor 12 is arranged inside an axial extension of the hybrid dual clutch transmission 10. The housing 18 is formed in two parts. The housing 18 has a pot-like housing region, which receives a stator 16 and the rotor 14 of the electric motor 12. The housing 18 of the electric motor 12 has an at least substantially planar housing region 30. The housing region 30 is arranged at least substantially perpendicularly to a rotor axis 32 of the electric motor 12 and axially on a side of the electric motor 12 facing towards the at least one connection unit 22. The housing region 30 has two at least substantially circular recesses 34, 36. A first recess 34 is provided to receive the second bearing point 26. A second recess 36 is provided to receive the third bearing point 28. The electric motor 12 has at least one supply port 40. The supply port 40 is arranged axially on a side of the electric motor 12 facing away from the connection unit 22. The supply port 40 is formed as a plug connection. The supply port 40 is provided to attach the electric motor 12 to an energy source, a coolant circuit and/or a data source. The electric motor 12 has a clearance 62. The clearance 62 is provided, in particular, for cooling the electric motor 12. The clearance 62 is formed between the housing 18 of the electric motor 12 and the stator 16. The clearance 62 is formed, in particular, as an air gap. The clearance 62 has a radial distance between the housing 18 of the electric motor 12 and the stator 16 of around 10 mm.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Hybrid dual clutch transmission
11 Internal combustion engine
12 Electric motor
14 Rotor
16 Stator
18 Housing
20 Drive element
22 Connection unit
24 First bearing point
26 Second bearing point
28 Third bearing point
30 Housing region
32 Rotor axis
34 First recess
36 Second recess
38 Main rotation axis
40 Supply port
42 Transmission head
44 First return spring
46 Second return spring
48 Return spring
50 Sealing element
52 Sealing element
54 Housing
56 Barrel housing
58 Cover housing
60 Output element
62 Clearance
64 Inner housing
B1 Actuation unit
B11 Actuation piston
B12 Actuation chamber
B2 Actuation unit
B21 Actuation piston B22 Actuation chamber
B3 Actuation unit
B31 Actuation piston
B32 Actuation chamber
K1 Clutch
K11 Inner disc carrier
K12 Outer disc carrier
K13 First force transmission region
K14 Inner discs
K15 Outer discs
K2 Clutch
K21 Inner disc carrier
K22 Outer disc carrier
K23 Second force transmission region
K24 Inner discs
K25 Outer discs
K3 Separating clutch
K31 Inner disc carrier
K32 Outer disc carrier
K33 Further force transmission region
K34 Inner discs
K35 Outer discs
T1 First sub-transmission
T2 Second sub-transmission
W1 Input shaft
W2 Input shaft
W3 Drive shaft
W4 Connection shaft

The invention claimed is:

1. Hybrid dual clutch transmission, comprising:
a first sub-transmission;
a second sub-transmission;
a first clutch allocated to the first sub-transmission;
a second clutch allocated to the second sub-transmission;
a separating clutch, which couples the hybrid dual clutch transmission to an internal combustion engine, wherein the first clutch has a first force transmission region and a first outer disc carrier, the second clutch has a second force transmission region and a second outer disc carrier, and the separating clutch has a further force transmission region and a further outer disc carrier, wherein the first force transmission region, the second force transmission region and the further force transmission region are stacked radially one above the other and are arranged substantially axially overlapping, wherein the first outer disc carrier, the second outer disc carrier, and the further outer disc carrier are permanently non-rotationally connected to one another;
an electric motor, which has a rotor, a stator and a housing;
a drive element, which is permanently non-rotationally connected to the first outer disc carrier of the first clutch to link the electric motor;
at least one connection unit, which comprises at least the first outer disc carrier of the first clutch, the second outer disc carrier of the second clutch, and the further outer disc carrier of the separating clutch; and
a first bearing point and a second bearing point supporting the at least one connection unit, wherein the first bearing point is arranged axially between the first, second, and further force transmission regions and the internal combustion engine, and the second bearing point is arranged axially between the first, second, and further force transmission regions and the first and second sub-transmissions.

2. The hybrid dual clutch transmission of claim 1, wherein the second bearing point supports the connection unit against the housing of the electric motor.

3. The hybrid dual clutch transmission of claim 1, further comprising:
a third bearing point, which supports the rotor of the electric motor against the housing of the electric motor, wherein the third bearing point and the second bearing point are arranged at least partially axially overlapping.

4. The hybrid dual clutch transmission of claim 3, wherein the housing of the electric motor has an at least substantially planar housing region, which is arranged substantially perpendicularly to a rotor axis of the electric motor and axially on a side of the electric motor facing towards the connection unit, wherein the at least substantially planar housing region has two at least substantially circular recesses, wherein a first one of the two at least substantially circular recesses receives the second bearing point and a second one of the two at least substantially circular recesses receives the third bearing point.

5. The hybrid dual clutch transmission of claim 1, wherein the further force transmission region of the separating clutch radially surrounds the first force transmission region of the first clutch in relation to a main rotation axis, and the first force transmission region of the first clutch radially surrounds the second force transmission region of the second clutch in relation to the main rotation axis.

6. The hybrid dual clutch transmission of claim 1, wherein the drive element is arranged substantially in a radial region of the first force transmission region.

7. The hybrid dual clutch transmission of claim 4, wherein the electric motor has an electrical supply port, which is arranged axially on a side of the electric motor facing away from the at least substantially planar housing region.

* * * * *